(12) United States Patent
Han et al.

(10) Patent No.: US 11,112,423 B2
(45) Date of Patent: Sep. 7, 2021

(54) ACCELERATION SENSOR

(71) Applicants: Beijing BOE Optoelectronics Technology Co., Ltd., Beijing (CN); BOE Technology Group Co., Ltd., Beijing (CN)

(72) Inventors: Yongjie Han, Beijing (CN); Shuqian Dou, Beijing (CN); Xiaoliang Fu, Beijing (CN); Ting Tian, Beijing (CN); Dayong Zhou, Beijing (CN); Zhiqiang Fan, Beijing (CN); Yawen Zhang, Beijing (CN); Youcai Yang, Beijing (CN); Dong Zhang, Beijing (CN); Zhongjun Wang, Beijing (CN); Yu Liu, Beijing (CN)

(73) Assignees: Beijing BOE Optoelectronics Technology Co., Ltd., Beijing (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 16/391,618

(22) Filed: Apr. 23, 2019

(65) Prior Publication Data

US 2019/0391175 A1 Dec. 26, 2019

(30) Foreign Application Priority Data

Jun. 21, 2018 (CN) .......................... 201810641753.9

(51) Int. Cl.
*G01P 15/08* (2006.01)
*G01P 1/02* (2006.01)
*G01P 1/07* (2006.01)
*G01P 15/00* (2006.01)
*G01P 15/12* (2006.01)

(52) U.S. Cl.
CPC .......... *G01P 15/0802* (2013.01); *G01P 1/023* (2013.01); *G01P 1/07* (2013.01); *G01P 15/006* (2013.01); *G01P 15/123* (2013.01)

(58) Field of Classification Search
CPC ......... G01P 15/0802; G01P 1/023; G01P 1/07
USPC ....................................... 73/514.01
See application file for complete search history.

(56) References Cited

U.S. PATENT DOCUMENTS

| | | | | |
|---|---|---|---|---|
| 2011/0240402 A1* | 10/2011 | Chou | ...................... | F16F 7/104 181/207 |
| 2014/0224014 A1* | 8/2014 | Wang | ...................... | F16F 15/00 73/504.04 |

FOREIGN PATENT DOCUMENTS

| | | |
|---|---|---|
| CN | 101539587 A | 9/2009 |
| CN | 103245798 A | 8/2013 |

(Continued)

OTHER PUBLICATIONS

Office Action for corresponding Chinese Application 201810641753.9 dated Mar. 16, 2020.

*Primary Examiner* — John Fitzgerald
*Assistant Examiner* — Rodney T Frank
(74) *Attorney, Agent, or Firm* — Arent Fox LLP; Michael Fainberg

(57) ABSTRACT

The disclosure discloses an acceleration sensor, where the acceleration sensor comprises: a housing, and a mass block in the housing and connected with the housing via at least two hanging beams, where an auxiliary buffer component is further provided between the mass block and a bottom surface of the housing, and an elastic coefficient of the auxiliary buffer component decreases as force applied thereon increases.

19 Claims, 3 Drawing Sheets

(56) References Cited

FOREIGN PATENT DOCUMENTS

| | | | |
|---|---|---|---|
| CN | 103350673 | A | 10/2013 |
| CN | 104280568 | A | 1/2015 |

* cited by examiner

ACCELERATION SENSOR

CROSS-REFERENCE TO RELATED APPLICATION

This Application claims priority to Chinese Patent Application No. 201810641753.9, filed on Jun. 21, 2018, the content of which is incorporated by reference in the entirety.

TECHNICAL FIELD

This disclosure relates to the field of sensor technologies, and particularly to an acceleration sensor.

DESCRIPTION OF THE RELATED ART

In a complex high overload impact environment, an impact-type acceleration sensor, which is mainly used for extracting the number of impacts, needs to have a good filter characteristic for filtering out interference signals during an impact process to thereby extract an accurate cross-layer characteristic. Due to the complexity and particularity of the impact process, components of acceleration signals received by the sensor are complex in characteristics; if the acceleration signals are uniformly filtered by setting a fixed mechanical filter frequency, characteristic signals of impact number extracted by the sensor may be doped with interference signals that are not filtered out, making it difficult to identify the characteristic signals of impact number.

SUMMARY

Embodiments of the disclosure provide an acceleration sensor.

In an aspect, the embodiments of the disclosure provide an acceleration sensor, including: a housing; a mass block in the housing and connected with the housing via at least two hanging beams; and an auxiliary buffer component between the mass block and a bottom surface of the housing; wherein an elastic coefficient of the auxiliary buffer component decreases as force applied thereon increases.

In some embodiments, the auxiliary buffer component includes a shear-thinning non-Newtonian fluid, and an elastic outer wall surrounding the shear-thinning non-Newtonian fluid.

In some embodiments, a material of the shear-thinning non-Newtonian fluid is a polyacrylamide or a polyvinyl acetal that is at least partially hydrolyzed.

In some embodiments, a material of the elastic outer wall is a rubber.

In some embodiments, holding bases for limiting a position of the auxiliary buffer component are provided on the bottom surface of the housing and a surface of the mass block facing the auxiliary buffer component.

In some embodiments, each of the holding bases shapes as an annulus and is sleeved at an outer side of the auxiliary buffer component.

In some embodiments, a groove is provided at an inner side of at least one of the holding bases; a protrusion is provided on the auxiliary buffer component at a position in contact with the at least one of the holding bases; and the protrusion of the auxiliary buffer component is tightly clamped with the groove of the at least one of the holding bases.

In some embodiments, the holding bases are fixedly connected with the housing and the mass block via an adhesive.

In some embodiments, the adhesive is an epoxy resin.

In some embodiments, two end surfaces of the auxiliary buffer component come into contact with the bottom surface of the housing and a lower end surface of the mass block, respectively; wherein the lower end surface of the mass block is a surface of the mass block facing the auxiliary buffer component.

In some embodiments, the lower end surface of the mass block completely covers an end surface, in contact with the lower end surface of the mass block, of the auxiliary buffer component.

In some embodiments, each of the at least two hanging beams is an elastic hanging beam of a strip shape.

In some embodiments, a surface of each of the at least two hanging beams is attached with a piezoelectric strip.

In some embodiments, the at least two hanging beams include four hanging beams, wherein two of the four hanging beams extend in a direction parallel to a first direction, the other two of the four hanging beams extend in a direction parallel to a second direction, and the second direction is perpendicular to the first direction.

In some embodiments, each of the at least two hanging beams is connected with an end surface of the mass block facing away from the auxiliary buffer component.

In some embodiments, each of the at least two hanging beams is connected with an end surface of the mass block facing the auxiliary buffer component.

In some embodiments, a shape of the auxiliary buffer component is a cylinder, a rectangle or a square.

In some embodiments, a shape of the mass block is a square.

In some embodiments, the housing is further provided with a support body fixed to an inner side wall of the housing, and the at least two hanging beams are fixed to the support body to thereby be connected with the inner side wall of the housing.

In some embodiments, the bottom surface of the housing is a surface that is perpendicular to a vibration direction of the mass block when the acceleration sensor is under impact.

BRIEF DESCRIPTION OF THE DRAWINGS

In order to make the technical solutions according to the embodiments of the disclosure more apparent, the drawings to which a description of the embodiments refers will be briefly introduced below, and apparently the drawings to be described below are merely illustrative of some of the embodiments of the disclosure, and those ordinarily skilled in the art can derive from these drawings other drawings without any inventive effort.

DETAILED DESCRIPTION OF THE EMBODIMENTS

In order to make the objects, technical solutions, and advantages of the embodiments of the disclosure more apparent, the technical solutions according to the embodiments of the disclosure will be described below clearly and fully with reference to the drawings in the embodiments of the disclosure, and apparently the embodiments described below are only a part but not all of the embodiments of the disclosure. Based upon the embodiments here of the disclosure, all the other embodiments which can occur to those skilled in the art without any inventive effort shall fall into the scope of the disclosure.

Unless defined otherwise, technical terms or scientific terms throughout the disclosure shall convey their usual meaning as appreciated by those ordinarily skilled in the art to which the disclosure pertains. The terms "first", "second", or the like throughout the disclosure do not suggest any order, number or significance, but is only intended to distinguish different components from each other. Alike, the terms "include", "comprise", or the like refer to that an element or an item preceding to the term encompasses an element(s) or an item(s) succeeding to the term, and its (or their) equivalence(s), but shall not preclude another element (s) or item(s). The term "connect", "connected", or the like does not suggest physical or mechanical connection, but may include electrical connection no matter whether it is direct or indirect. The terms "above", "below", "left", "right", etc., are only intended to represent a relative positional relationship, and when the absolute position of an object as described is changed, the relative positional relationship may also be changed accordingly.

For the sake of clarity and conciseness of the following description of the embodiments of the disclosure, a detailed description of known functions and components will be omitted in the disclosure.

Figure 2:
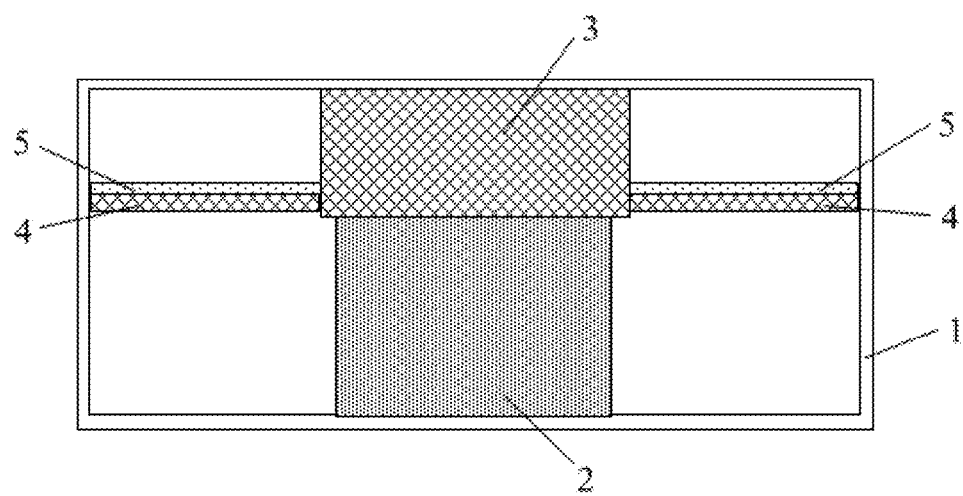
FIG. 2 is a schematic structural diagram of an acceleration sensor without being impacted according to the embodiments of the disclosure in a sectional view.
Figure 3:
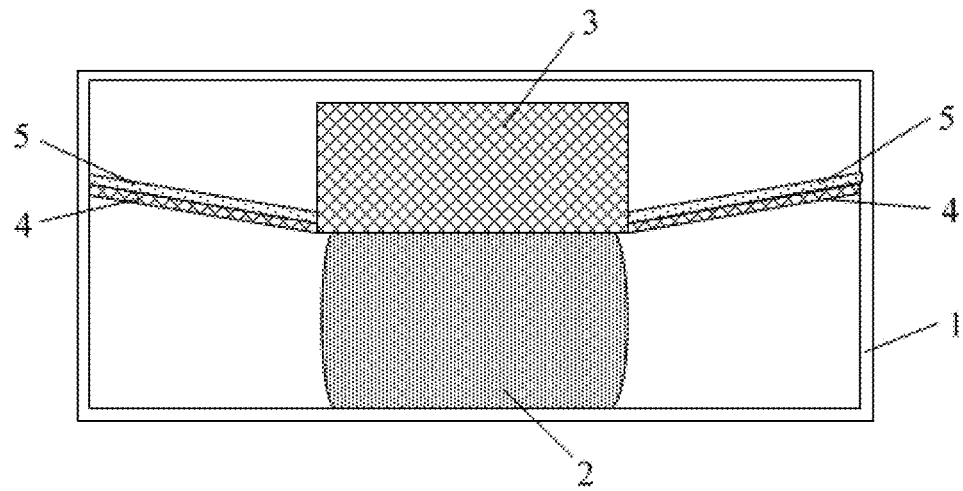
FIG. 3 is a schematic structural diagram of an acceleration sensor under impact according to the embodiments of the disclosure in a sectional view.
Figure 4:
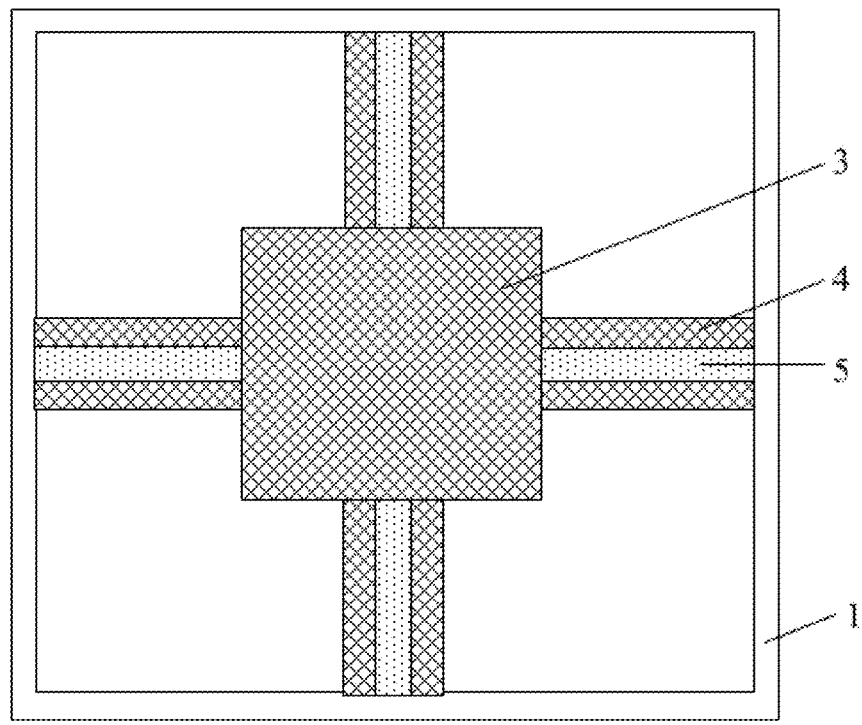
FIG. 4 is a schematic structural diagram of an acceleration sensor according to the embodiments of the disclosure in a top view.

Referring to FIG. 2 to FIG. 4, where FIG. 2 is a schematic structural diagram of an acceleration sensor without being impacted in a sectional view, FIG. 3 is a schematic structural diagram of an acceleration sensor under impact in a sectional view, and FIG. 4 is a schematic structural diagram of an acceleration sensor in a top view, the embodiments of the disclosure provide an acceleration sensor, including: a housing 1, and a mass block 3 in the housing 1 and connected with the housing 1 via at least two hanging beams 4, where an auxiliary buffer component 2 is further arranged between the mass block 3 and a bottom surface of the housing 1, and an elastic coefficient of the auxiliary buffer component 2 decreases as force applied thereon increases. Where the bottom surface of the housing may refer to a surface that is perpendicular to a vibration direction of the mass block when the acceleration sensor is impacted.

In some embodiments, the hanging beams 4 can be elastic hanging beams of a strip shape. Further, a surface of each hanging beam can be attached with a piezoelectric strip 5, and the piezoelectric strip 5 can generate a charge as being subjected to a force to thereby enable the acceleration sensor to detect relevant parameters.

Figure 1:
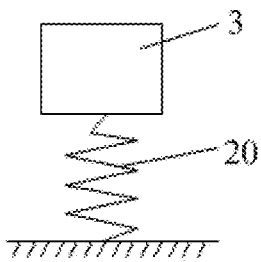
FIG. 1 is a schematic diagram of an equivalent structure of an acceleration sensor according to the embodiments of the disclosure.

In the embodiments of the disclosure, the acceleration sensor includes the housing, and the mass block that is arranged in the housing and connected with the housing via at least two hanging beams, where the auxiliary buffer component is further arranged between the mass block and the bottom surface of the housing, and the elastic coefficient of the auxiliary buffer component decreases as applied force is increasing, therefore, the elastic coefficient of the auxiliary buffer component and that of the hanging beams together constitute a total elastic coefficient of the acceleration sensor, and the total elastic coefficient affects a filter frequency of the acceleration sensor together with a mass of the mass block (that is, the acceleration sensor in the embodiments of the disclosure can be simplified into a single-degree-of-freedom spring mass system composed of a mass block 3 and a spring 20 as illustrated in FIG. 1, and a natural frequency of the acceleration sensor and an elastic coefficient of the spring satisfy the relationship of:

$$\omega = \sqrt{\frac{k_0}{m}} = \sqrt{\frac{k_1 + k_2}{m}};$$

where, w refers to a natural frequency of the acceleration sensor, namely a filter cutoff frequency of the acceleration sensor, $k_1$ refers to an elastic coefficient of the auxiliary buffer component, $k_2$ refers to an elastic coefficient of a hanging beam, and m refers to a mass of the mass block). When the acceleration sensor is subjected to a high overload impact, the elastic coefficient of the auxiliary buffer component becomes smaller, while the elastic coefficient of each hanging beam and the mass of the mass block are kept unchanged, which may lower the filter frequency of the acceleration sensor to thereby filter out most of the high-frequency interference signals and obtain a strong filtering ability; and accordingly, the problems that an acceleration sensor in the related art can only filter signals of a fixed frequency band and has a weak filtering ability and a complicated process in selecting a reasonable filter frequency at an early stage can be solved. Further, when the acceleration sensor in the embodiments of the disclosure is subjected to a low overload impact, the elastic coefficient of the auxiliary buffer component becomes larger, while the elastic coefficient of each hanging beam and the mass of the mass block are kept unchanged, which may increase the filter frequency of the acceleration sensor and guarantee a low-frequency sensitivity of the acceleration sensor.

In some embodiments, the auxiliary buffer component 2 includes a shear-thinning non-Newtonian fluid, and an elastic outer wall (not illustrated) surrounding the shear-thinning non-Newtonian fluid. In the embodiments of the disclosure, the auxiliary buffer component 2 includes a shear-thinning non-Newtonian fluid with a viscosity varying with a shear rate, for example, in the embodiments of the disclosure, a non-Newtonian fluid having a viscosity that decreases with an increasing shear rate is adopted as the auxiliary buffer component of the acceleration sensor, and the non-Newtonian fluid has different viscosities under different external forces, for example, the viscosity becomes smaller under a high overload impact, and becomes larger under a low overload impact. In this way, under the high overload impact, the filter frequency of the acceleration sensor may be reduced to filter out most of the high-frequency interference signals and thereby get a strong filtering ability; and under the low overload impact, the filter frequency of the sensor may be increased to guarantee the low-frequency sensitivity of the acceleration sensor. In addition, as a flowing fluid, the shear-thinning non-Newtonian fluid can be surrounded by an elastic outer wall at its outer side to limit its position; and if the shear-thinning non-Newtonian fluid is subjected to an impact, the elastic outer wall can be deformed correspondingly to prevent the elastic outer wall from affecting the performance of the shear-thinning non-Newtonian fluid. Further, in some embodiments, a material of the elastic outer wall can be a rubber.

In some embodiments, a material of the shear-thinning non-Newtonian fluid is a polyacrylamide or a polyvinyl acetal that is partially or completely hydrolyzed.

Figure 5:
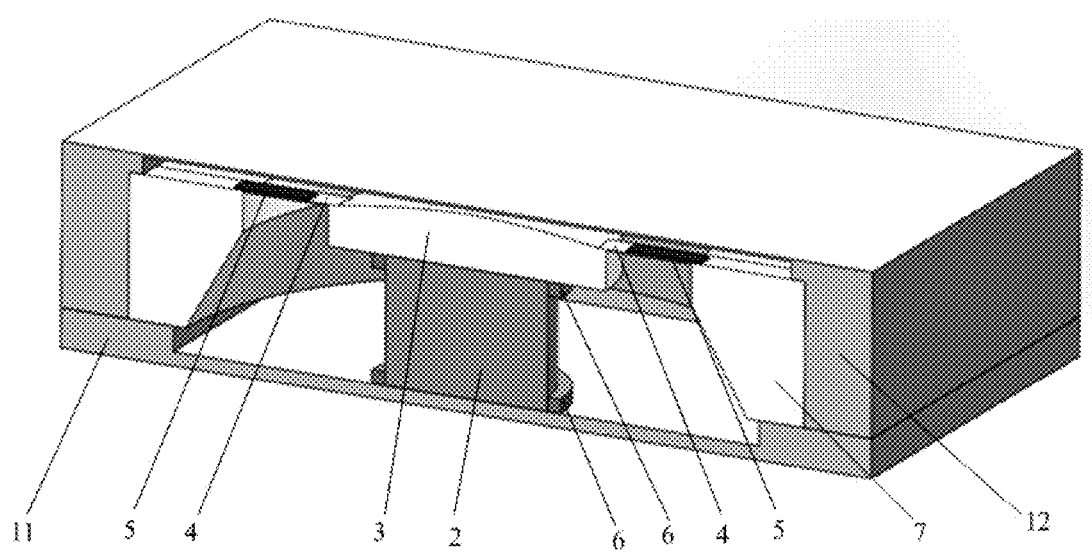
FIG. 5 is a schematic three-dimensional stereoscopic diagram of an acceleration sensor according to the embodiments of the disclosure.

In some embodiments, FIG. 5 illustrates a schematic three-dimensional stereoscopic diagram of the acceleration sensor according to the embodiments of the disclosure, as illustrated in FIG. 5, the acceleration sensor is provided with holding bases 6 configured to limit a position of the auxiliary buffer component 2 on the bottom surface 11 of the housing 1 and a surface of the mass block 3 facing the auxiliary buffer component 2. In the embodiments of the disclosure, the holding bases 6 for limiting the position of the auxiliary buffer component 2 are provided both on the bottom surface 11 of the housing 1 and the surface of the mass block 3 facing the auxiliary buffer component 2, so as to fix a top end and a bottom end of the auxiliary buffer component 2, therefore, the auxiliary buffer component can expand only in a horizontal direction as being subjected to a force, and a relative position between the auxiliary buffer component 2 and the housing 1 can be kept unchanged after resetting since the top end and the bottom end are fixed, thereby ensuring the repeatability and consistency of the acceleration sensor.

In some embodiments, each holding base has an annular shape. For example, when the auxiliary buffer component 2 is cylindrical, both of the two holding bases 6 can be a circular ring and sleeved at an outer side of the auxiliary buffer component. In some embodiments, the connection between the auxiliary buffer component 2 and the holding bases 6 can also be as follows: a groove, which is arranged at an inner side of a holding base 6 at one end of the auxiliary buffer component 2, and a protrusion, which is arranged at a position of the auxiliary buffer component 2 in contact with the holding base 6, are tightly clamped with each other; and a holding base 6 at the other end of the auxiliary buffer component 2 is shaped as an annulus, e.g. a circular ring, and sleeved on the auxiliary buffer component 2 to merely limit a movement of the auxiliary buffer component in the horizontal direction. Of course, it is also possible that the two holding bases 6 are both provided with grooves at their inner sides, and the auxiliary buffer component 2 is provided with corresponding protrusions at positions in contact with the holding bases 6. Or, it is also possible that both the holding bases are not provided with grooves, and the auxiliary buffer component 2 is not provided with corresponding protrusions; that is, the two holding bases 6 are both smooth annuluses, e.g. smooth circular rings, which will not be limited herein. Further, in some embodiments, the holding bases 6 can be fixedly connected with the housing 1 and the mass block 3 via an adhesive, where the adhesive can be epoxy resin or the like.

In some embodiments, the auxiliary buffer component 2 may have a cylindrical shape, a rectangular shape or a square shape. For example, the mass block 3 may have a square shape, and the auxiliary buffer component 2 may have a cylindrical shape, and under this case, as illustrated in FIG. 5, two end surfaces of the cylindrical auxiliary buffer component can be in contact with the bottom surface 11 of the housing 1 and a lower end surface of the mass block 3 of the square shape, respectively, where the lower end surface of the mass block 3 completely covers a circular top surface of the cylindrical auxiliary buffer component. Further, it shall be noted that, if the auxiliary buffer component 2 has a rectangular shape or a square shape, any two opposite end surfaces of the rectangular auxiliary buffer component or the square auxiliary buffer component may be correspondingly in contact with the bottom surface 11 of the housing 1 and the mass block 3, which will not be limited herein.

In some embodiments, as illustrated in FIG. 4, the housing 1 is provided with four hanging beams 4 therein, where two of the four hanging beams 4 extend in a direction parallel to a first direction (a horizontal direction as illustrated in FIG. 4), and the other two hanging beams 4 extend in a direction parallel to a second direction (a vertical direction as illustrated in FIG. 4), where the second direction is perpendicular to the first direction. In the embodiments of the disclosure, the housing 1 is provided with four hanging beams 4 therein, where two of the four hanging beams 4 extend in the direction parallel to the first direction, and the other two hanging beams 4 extend in the direction parallel to the second direction that is perpendicular to the first direction, that is, the mass block 3 is fixed to an inner side wall of the housing 1 by the four hanging beams 4 arranged in two directions that are perpendicular to each other, and the four hanging beams 4 can be all provided with piezoelectric strips 5 to balance positions of the piezoelectric strips 5, so that changes of charges can be measured more effectively from various positions when a force is applied, and thereby corresponding information on demand can be tested accurately by the acceleration sensor.

In some embodiments, each hanging beam 4 is connected with an end surface of the mass block 3 facing away from the auxiliary buffer component 2, as illustrated in FIG. 5; or, each hanging beam 4 is connected with an end surface of the mass block 3 facing the auxiliary buffer component 2, as illustrated in FIG. 2. In the embodiments of the disclosure, a micro fabrication process (MEMS) can be adopted to easily enable the hanging beams 4 to be connected with the end surfaces of the mass block 3 facing away from the auxiliary buffer component 2, or enable the hanging beams 4 to be connected with the end surfaces of the mass block 3 facing the auxiliary buffer component 2; where the MEMS process generally includes etching, deposition, etc., and can form the hanging beams 4 and the mass block 3 integrally, which can thereby simplify the manufacturing process of the acceleration sensor.

In some embodiments, as illustrated in FIG. 5, the housing 1 is further provided with a support body 7 fixed to the inner side wall 12 of the housing 1, and the hanging beams 4 are fixed to the support body 7 to thereby be connected with the inner side wall 12 of the housing 1.

Advantageous effects of the embodiments of the disclosure are as follows: in the embodiments of the disclosure, the acceleration sensor includes the housing, and the mass block that is arranged in the housing and connected with the housing via at least two hanging beams, where the auxiliary buffer component is further arranged between the mass block and the bottom surface of the housing, and the elastic coefficient of the auxiliary buffer component decreases as applied force is increasing, therefore, the elastic coefficient of the auxiliary buffer component and that of the hanging beams together constitute a total elastic coefficient of the acceleration sensor, and the total elastic coefficient affects a filter frequency of the acceleration sensor together with a mass of the mass block (that is, the acceleration sensor in the embodiments of the disclosure can be simplified into a single-degree-of-freedom spring mass system composed of a mass block and a spring, and a natural frequency of the acceleration sensor and an elastic coefficient of the spring satisfy the relationship of:

$$\omega = \sqrt{\frac{k_0}{m}} = \sqrt{\frac{k_1 + k_2}{m}};$$

where, w refers to a natural frequency of the acceleration sensor, namely a filter cutoff frequency of the acceleration sensor, $k_1$ refers to an elastic coefficient of the auxiliary buffer component, $k_2$ refers to an elastic coefficient of a hanging beam, and m refers to a mass of the mass block). When the acceleration sensor is subjected to a high overload impact, the elastic coefficient of the auxiliary buffer component becomes smaller, while the elastic coefficient of each hanging beam and the mass of the mass block keep unchanged, which may lower the filter frequency of the acceleration sensor to thereby filter out most of the high-frequency interference signals and obtain a strong filtering ability; and accordingly, the problems that an acceleration sensor in the related art can only filter signals of a fixed frequency band and has a weak filtering ability and a complicated process in selecting a reasonable filter frequency at an early stage can be solved. Further, when the acceleration sensor in the embodiments of the disclosure is subjected to a low overload impact, the elastic coefficient of the auxiliary buffer component becomes larger, while the elastic coefficient of each hanging beam and the mass of the mass block keep unchanged, which may increase the filter frequency of the acceleration sensor and guarantee a low-frequency sensitivity of the acceleration sensor.

Evidently those skilled in the art can make various modifications and variations to the disclosure without departing from the spirit and scope of the disclosure. Accordingly the disclosure is also intended to encompass these modifications and variations thereto so long as the modifications and variations come into the scope of the claims appended to the disclosure and their equivalents.

The invention claimed is:

1. An acceleration sensor, comprising:
   a housing;
   a mass block in the housing and connected with the housing via at least two hanging beams;
   and an auxiliary buffer component between the mass block and a bottom surface of the housing;
   wherein an elastic coefficient of the auxiliary buffer component decreases as force applied thereon increases;
   wherein a filter frequency of the acceleration sensor decreases as the force applied thereon increases;
   wherein the auxiliary buffer component comprises a shear-thinning non-Newtonian fluid, and an elastic outer wall surrounding the shear-thinning non-Newtonian fluid.

2. The acceleration sensor according to claim 1, wherein a material of the shear-thinning non-Newtonian fluid is a polyacrylamide or a polyvinyl acetal that is at least partially hydrolyzed.

3. The acceleration sensor according to claim 1, wherein a material of the elastic outer wall is a rubber.

4. The acceleration sensor according to claim 1, wherein holding bases for limiting a position of the auxiliary buffer component are provided on the bottom surface of the housing and a surface of the mass block facing the auxiliary buffer component.

5. The acceleration sensor according to claim 4, wherein each of the holding bases shapes as an annulus and is sleeved at an outer side of the auxiliary buffer component.

6. The acceleration sensor according to claim 5, wherein a groove is provided at an inner side of at least one of the holding bases; a protrusion is provided on the auxiliary buffer component at a position in contact with the at least one of the holding bases; and the protrusion of the auxiliary buffer component is tightly clamped with the groove of the at least one of the holding bases.

7. The acceleration sensor according to claim 4, wherein the holding bases are fixedly connected with the housing and the mass block via an adhesive.

8. The acceleration sensor according to claim 7, wherein the adhesive is an epoxy resin.

9. The acceleration sensor according to claim 4, wherein two end surfaces of the auxiliary buffer component come into contact with the bottom surface of the housing and a lower end surface of the mass block, respectively; wherein the lower end surface of the mass block is a surface of the mass block facing the auxiliary buffer component.

10. The acceleration sensor according to claim 9, wherein the lower end surface of the mass block completely covers an end surface, in contact with the lower end surface of the mass block, of the auxiliary buffer component.

11. The acceleration sensor according to claim 1, wherein each of the at least two hanging beams is an elastic hanging beam of a strip shape.

12. The acceleration sensor according to claim 1, wherein a surface of each of the at least two hanging beams is attached with a piezoelectric strip.

13. The acceleration sensor according to claim 12, wherein the at least two hanging beams comprise four hanging beams, wherein two of the four hanging beams extend in a direction parallel to a first direction, the other two of the four hanging beams extend in a direction parallel to a second direction, and the second direction is perpendicular to the first direction.

14. The acceleration sensor according to claim 1, wherein each of the at least two hanging beams is connected with an end surface of the mass block facing away from the auxiliary buffer component.

15. The acceleration sensor according to claim 1, wherein each of the at least two hanging beams is connected with an end surface of the mass block facing the auxiliary buffer component.

16. The acceleration sensor according to claim 1, wherein a shape of the auxiliary buffer component is a cylinder, a rectangle or a square.

17. The acceleration sensor according to claim 1, wherein a shape of the mass block is a square.

18. The acceleration sensor according to claim 1, wherein the housing is further provided with a support body fixed to an inner side wall of the housing, and the at least two hanging beams are fixed to the support body to thereby be connected with the inner side wall of the housing.

19. The acceleration sensor according to claim 1, wherein the bottom surface of the housing is a surface that is perpendicular to a vibration direction of the mass block when the acceleration sensor is under impact.

* * * * *